United States Patent [19]
Hawver

[11] Patent Number: 5,492,325
[45] Date of Patent: Feb. 20, 1996

[54] MATH GAME DEVICE

[76] Inventor: Albert J. Hawver, 7650 Gulf Way, Hudson, Fla. 34667

[21] Appl. No.: 420,934

[22] Filed: Apr. 12, 1995

[51] Int. Cl.$^6$ .............................. A63F 7/04; G09B 5/00
[52] U.S. Cl. ................ 273/115; 273/118 R; 273/118 A; 273/123 R; 273/123 A; 273/108; 273/153 R; 434/201; 434/208; 434/209
[58] Field of Search .................................. 273/108, 115, 273/118 R, 118 A, 123 R, 123 A, 153 R; 434/188, 201, 208, 209

[56] References Cited

U.S. PATENT DOCUMENTS

| | | | |
|---|---|---|---|
| 447,418 | 3/1891 | Wheeler | 273/115 |
| 624,158 | 5/1899 | Barrett | 273/115 |
| 3,204,345 | 9/1965 | Buckner | 434/208 |
| 3,947,976 | 4/1976 | Hafel | 434/201 |
| 3,964,748 | 6/1976 | Harvey, Jr. | 273/115 X |
| 4,085,523 | 4/1978 | Duncan | 434/201 |
| 5,346,399 | 9/1994 | Sakow | 434/188 X |

*Primary Examiner*—Raleigh W. Chiu
*Attorney, Agent, or Firm*—Joseph C. Mason, Jr.; Ronald E. Smith

[57] ABSTRACT

A game device has a flat, circular bottom wall with a plurality of ball-receiving wells formed in it and a transparent dome-shaped cover that captures a plurality of balls within the device. Some of the wells have a number shape, and each of those wells are color coded. The game is played by inverting the device and restoring it to its upright position or by shaking it until all of the balls have entered into the wells. The number of balls within a well are counted and multiplied by the number of the well into which they have fallen to arrive at a total for that well. Depending upon the color of the well, the total is either added to or subtracted from an earlier total and the process is repeated to arrive at an arithmetic sum. A pair of wells are also formed in the shape of a multiply sign and a divide sign and the arithmetic sum is multiplied by the number of balls in the multiply sign-shaped well and that number is divided by the number of balls in the divide sign-shaped well. A uniquely marked ball is then used to calculate a percentage of the previous number and that number is added to or subtracted from the previous number, depending upon which well the uniquely marked ball came to rest. In additional embodiments, the balls are counted by ball sensors and the arithmetical calculations are performed by a microprocessor that drives a display device that provides a read out of the correct answer.

9 Claims, 3 Drawing Sheets

MATH GAME DEVICE

BACKGROUND OF THE INVENTION

1. Field of the Invention

This invention relates, generally, to an amusement game. More particularly, it relates to a game that provides a math drill in a form that children enjoy so that they learn while playing.

2. Description of the prior Art

Games where metal or plastic balls are contained within a flat-bottomed container with a transparent cover are well known. Typically, a plurality of ball-receiving wells are formed in the flat bottom wall of the device in a predetermined pattern, and the object of the game is to tilt the device to make the balls roll into the various wells. The difficulty in these games arises from the fact that tilting the device in one direction to encourage a ball to roll into a well may cause a ball that was previously successfully rolled into a well to dislodge therefrom.

These well known games teach motor skills and as such have utility. However, math tests scores in the U.S. decline every year relative to the scores of children in other countries because children in this country are apparently not receiving as much practice in basic math skills as those in other countries. Unfortunately, children view math drills as boring, and would prefer to spend their time in play than in drills.

What is needed, then, is a game device that children will enjoy playing with but which provides a math drill rather than a lesson in motor skills.

However, in view of the prior art at the time the present invention was made, it was not obvious to those of ordinary skill in the field of game devices how such a game device could be provided.

SUMMARY OF THE INVENTION

The longstanding but heretofore unfulfilled need for an amusing game device that attracts and holds the attention of children and which provides needed math drills has now been provided.

The novel game device includes a flat bottom wall having a plurality of ball-receiving wells formed therein, a plurality of balls disposed in rolling engagement atop said flat bottom wall, and a transparent dome or other cover for enclosing the structure.

Each well formed in the bottom wall has the shape of a number, a multiply sign (x), or a divide sign (÷). Significantly, the space occupied by the numbers or the mathematical signs as a percentage of the total space available on the bottom wall may be varied to provide games appropriate for children of differing ages.

In a preferred embodiment of the game, a first set of numbers consisting of the numbers 1–9 are formed in the outer periphery of the bottom wall of the device, in equidistantly, sequentially, and circumferentially spaced relation to one another, and all of said numbers have a predetermined common height. In other embodiments, the size or height of the numbers could vary.

A second set of numbers, also consisting of the numbers 1–9, are formed in the bottom wall of the device, radially inwardly of said first set of numbers, in equidistantly, sequentially, and circumferentially spaced relation to one another. All numbers of said second set of numbers preferably have a predetermined common height, but said height need not necessarily be the same height as said numbers of said first set of numbers. Moreover, the size or height of the numbers of said second set of numbers may vary.

A multiply sign and a divide sign are formed in the central region of the bottom wall, i.e., radially inwardly of said first and second sets of numbers. The percentage of bottom wall space occupied by said signs may also be varied to control the difficulty level of the game.

A predetermined plurality of balls are placed within the device at the time of its manufacture; the number of balls placed therein may also be varied to control the level of difficulty of the game. In a preferred embodiment, all of the balls but one have a common color so that the lone ball that lacks the common color is easily distinguishable from the other balls.

In a preferred embodiment, the numbers in the first set of numbers have a greater size then the numbers of the second set, for reasons that will become clear as this description proceeds.

To play the game, the device is inverted so that all of the balls are supported by the transparent, dome-shaped cover of the device. The device is then inverted again so that the balls are supported by the bottom wall of the device, and the device is shook as needed until all of the balls have fallen into respective wells. Beginning with the number "9" in the first set of numbers, the child counts the number of ordinary balls therein (i.e., excluding or including the unique ball, depending upon which rule is being followed) and adds the number "9" to itself that many times. For example, if three ordinary balls are in the "9" well, the child adds "9" to itself three times and arrives at the number "27". Moving counterclockwise about the bottom wall, the child then counts the number of balls in the contiguous well having the shape of a number of the second set of numbers. For example, if the number of ordinary balls in the second set of numbers adjacent "9" is "3", the child counts the balls in said "3" well, adds the number three to itself for as many balls as counted, and subtracts that number from 27. Thus, if four balls are in the "3" of the second set of numbers, the child arrives at the number "12" and subtracts that number from "27", arriving at the arithmetic sum of 15. That process is repeated all around the ball until all of the adding and subtracting has been completed to arrive at a total arithmetic sum. The total arithmetic sum is then multiplied by the number of balls in the well shaped like a multiply sign, and that number is divided by the number of balls in the well shaped like a divide sign to arrive at a total. Finally, the lone ball having a unique color is located, and if that ball has come to rest in the multiply or divide sign, no further calculations are required. However, if it has come to rest in any number of the first set of numbers, the value of the number is noted and the total is multiplied by said percentage number to arrive at a penultimate number, and the final number is calculated by adding the penultimate number to the total. If the unique ball has come to rest in a number well of the second set of numbers, the same procedure is followed except that the penultimate number is subtracted from the total to arrive at a final number.

In a preferred embodiment, all numbers of the first set of numbers are of a common color, and all numbers of the second set of numbers are of a common color different from the common color of the numbers of the first set. This helps the children to remember that the numbers of the first set represent addition and the numbers of the second set represent subtraction.

When two or more children play the game just described, they may compare their final answers with each other. If all agree, the number is probably correct, but the careful participation of an adult would be required before the answers could be verified as correct.

In a second embodiment, a ball-counting sensor is placed in the bottom of each well so that the number of balls in each well is calculated by a sensor independently of the physical count conducted by the children playing the game. The sensor may be weight-responsive, or physical presence-responsive. Each sensor generates a signal that conveys information concerning the number of balls detected by it, and sends said signal to a microprocessor that performs the same calculations performed by the children. The microprocessor drives a display device that displays the correct answer.

The display device may be mounted on the bottom side of the bottom wall so that it cannot be seen during play. If so mounted, the device must be inverted to read the correct answer, and such inverting would disturb the location of the balls and the child would not be able to go back and perform a recalculation in the event the figure determined by the child disagrees with the correct figure calculated by the microprocessor. Alternatively, the child could carefully lift the device without inverting it so that the display could be read, but such lifting, if not performed carefully, could cause dislodging and relocation of at least one ball, making any recalculation impossible.

There are two preferred ways of mounting the display device so that a recalculation can be performed if needed. In one preferred mounting, the display device is slideably mounted on the bottom of the bottom wall in a drawer-like mounting, with the display facing the bottom wall so that it can not be read when the device is inverted or lifted. When the game is in progress, the display device is slid under the bottom wall so that said display device may not be seen. When the game is over, the display device is slid out from under the bottom wall and the correct answer is read in the absence of a need to invert or lift the game device; this is the third embodiment of the invention. If the children make a miscalculation when playing with the third embodiment, they can try again.

In a second preferred mounting, the sensing means, the microprocessor means, and the display means are provided in a unit separate from the game device itself; this is the fourth embodiment of the invention. Thus, there are no ball sensors associated with each well while the game is being played. However, when the children have finished the game, they place the game device onto a stand that receives it. The stand includes a ball-sensing means, a microprocessor, and a display means so that the balls in each well are counted by the sensors in the stand when the game device is placed therein, and the sensors generate and send their respective signals to the microprocessor which displays the correct answer in the display means. This provides extra fun for the children as they place the game device on the sensor and read the virtually instantaneously available correct answer as it appears on the display device. The speedy answer provided by the microprocessor would also spark their interest in computers, thereby providing a side benefit.

It is therefore clear that the primary object of this invention is to provide a math game device that children will enjoy playing so that they receive math drills in a fun environment.

Additional objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
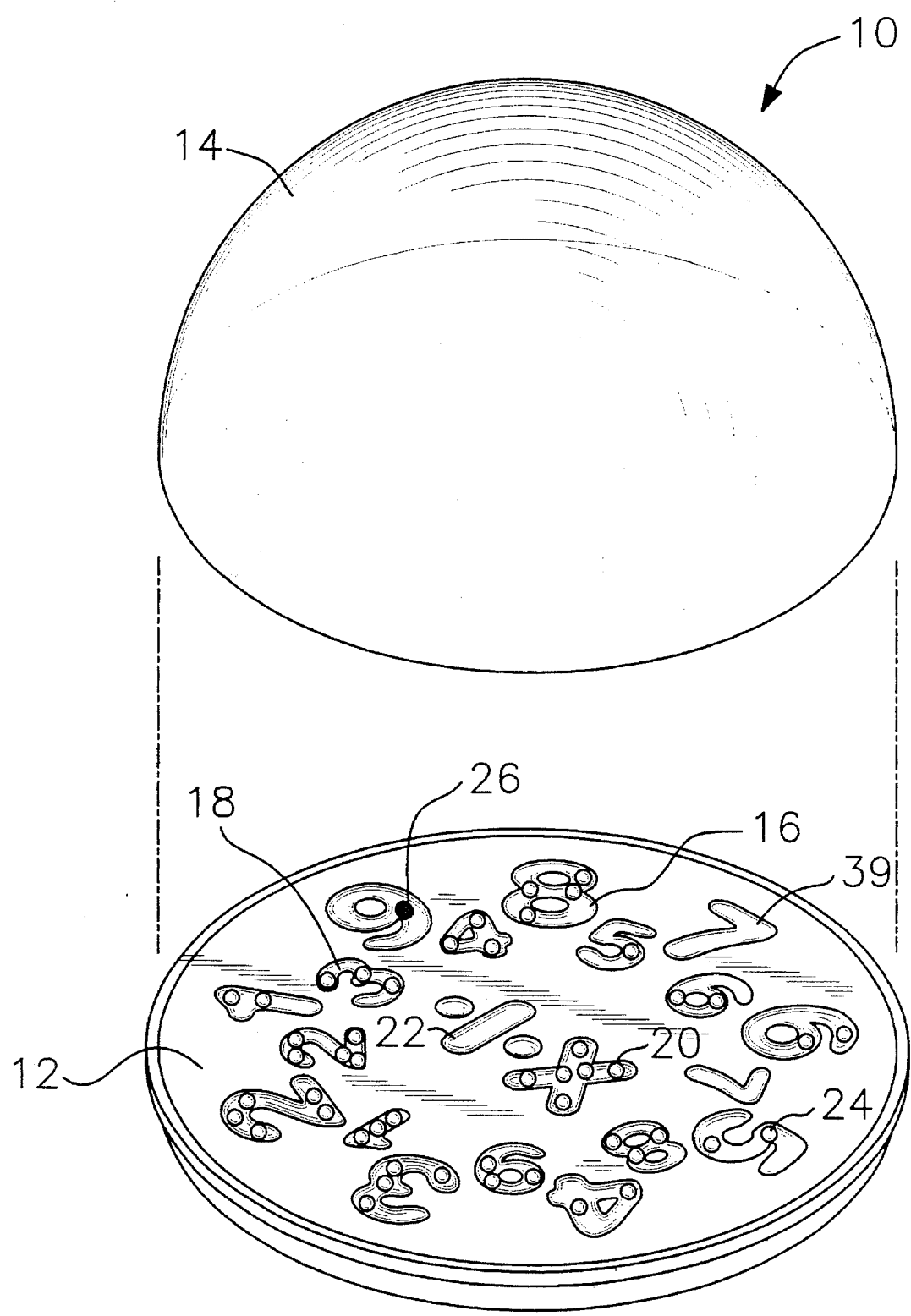
FIG. 1 is a perspective view of a first embodiment of the novel game device.

Referring now to FIG. 1, it will there be seen that an illustrative embodiment of the invention is denoted as a whole by the reference numeral 10.

Game device 10 has a circular, flat bottom wall 12 and a transparent dome 14. A first set of ball-receiving wells, each of them in the shape of a number as depicted, are formed in said bottom wall and are collectively denoted 16. Wells 16 are equidistantly and circumferentially spaced apart from one another on the outer periphery of bottom wall 12, and all of said wells have a predetermined common size as depicted.

A second set of ball-receiving wells, each of them in the shape of a number as depicted, are also formed in said bottom wall and are collectively denoted 18. Wells 18 are equidistantly and circumferentially spaced apart from one another, radially inwardly of the first set of wells 16, and all of said wells 18 have a predetermined common size as depicted. Significantly, in this embodiment, the numbers in said second set are smaller than the numbers in said first set.

A well in the form of a multiply sign 20 and a well in the form of a divide sign 22 are formed in the central region of bottom wall 12, radially inwardly of the first and second sets of wells.

A plurality of balls of a common color, collectively denoted 24, are enclosed within novel device 10. A uniquely colored ball is denoted 26.

For the particular orientation of balls depicted in FIG. 1, the final answer arrived at by following the steps disclosed above is −87.4. Specifically, the final answer is calculated as follows:

0−9+2−10+10−3+12−27+8−24+10−0+12−12+0−5+32−12
=−16 (arithmetic sum)×6=−96 (total) multiplied by 0.09= 8.64 percentage. The percentage is then added to the total because the unique ball 26 was positioned in a number of the first set of numbers, and the final answer is −87.36, which is rounded off to −87.4. In this example the division step was skipped because division by 0 is impossible.

Figure 2:
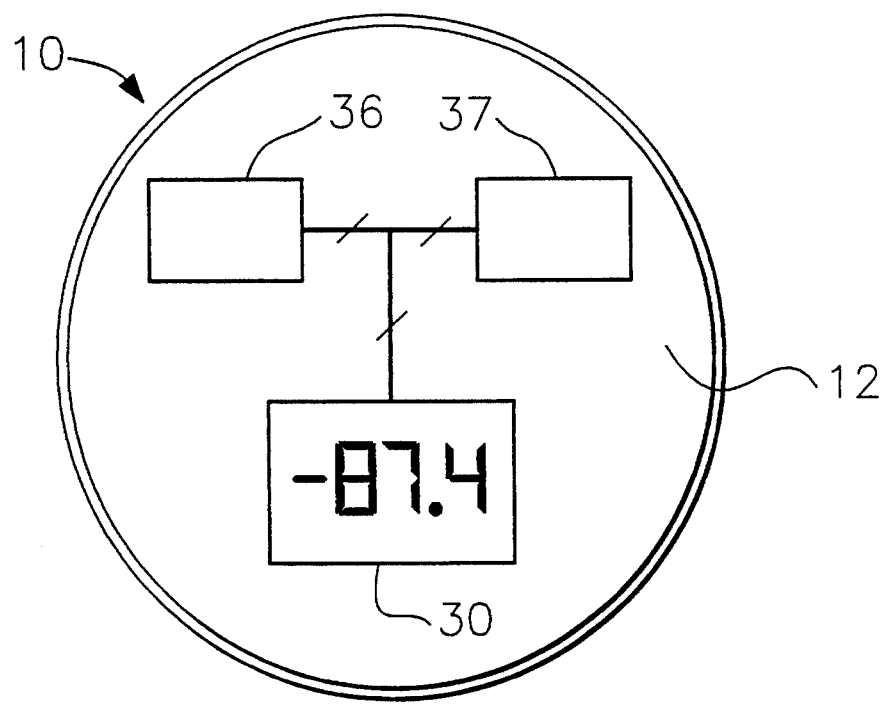
FIG. 2 is a bottom plan elevational view of a second embodiment thereof.

In a second embodiment, the final answer is displayed in display device 30 on the bottom side of bottom wall 12 as depicted in FIG. 2 and may be viewed by inverting device 10 or lifting it up without inverting it as aforesaid. Battery 36 provides power to microprocessor 37 that performs calculations based upon the input provided from sensors 39 (FIG. 1) disposed in each well formed in bottom wall 12. Although the sensors could take many different forms, the balls could be metallic so that they conduct electricity and complete a circuit when seated in a well. Unique ball 26 could be heavier or lighter than ordinary balls 24, and its presence could be detected by its weight. Other means for detecting the presence of the unique ball in a particular well will be apparent to those skilled in the pertinent art.

Figure 3:
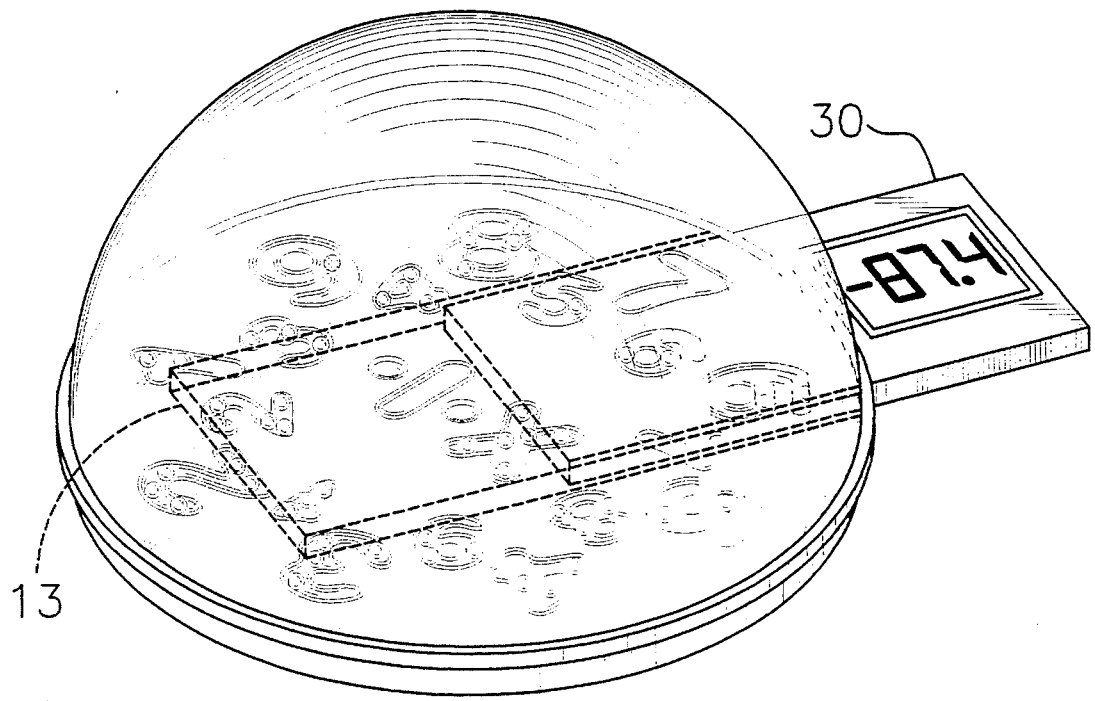
FIG. 3 is a perspective view of a third embodiment of the device.

In a third embodiment, display device 30 is inverted relative to its FIG. 2 orientation and is slideably mounted under bottom wall 12 on tracks 13 so that it is viewable only when slid out from thereunder as depicted in FIG. 3. Any suitable slideable mounting means is within the scope of this invention.

Figure 4:
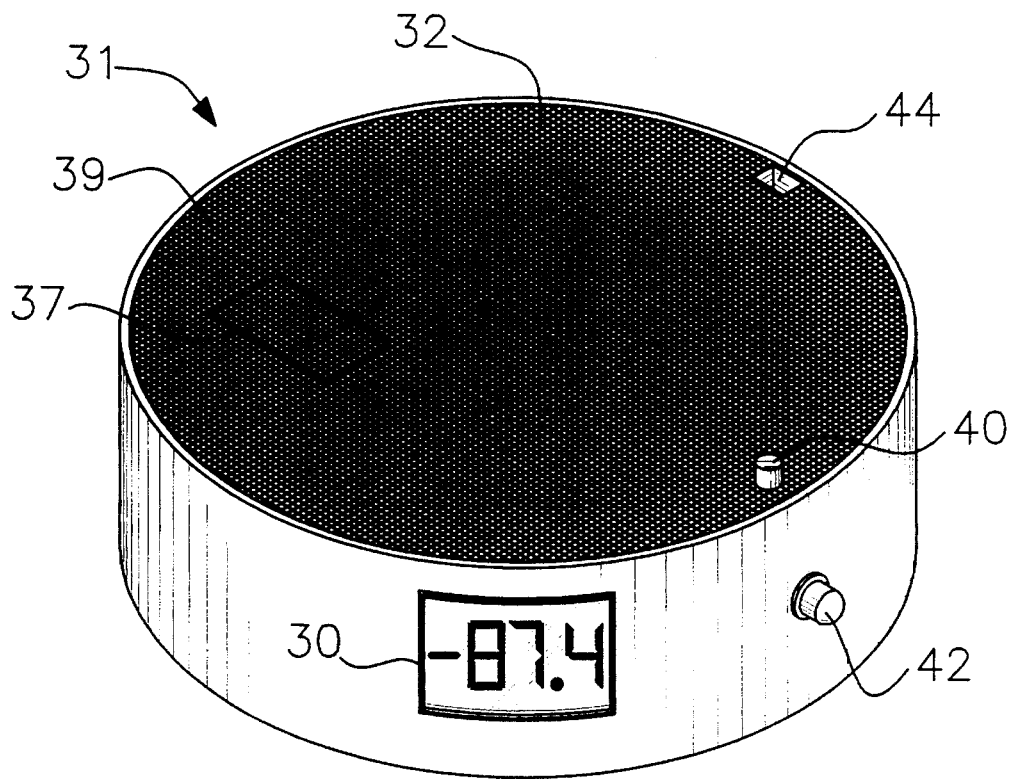
FIG. 4 is a perspective view of a sensing and display stand of a fourth embodiment of this invention.

In a fourth embodiment, depicted in FIG. 4, the display means 30 is not affixed to bottom wall 12 as it is in the first two embodiments. Moreover, wells 16, 18, 20, and 22 of game device 10 are not equipped with ball counting sensors. Instead, a separate stand 31 that performs those functions is provided. Stand 31 has a flat top surface 32 that supports game device 10 when bottom wall 12 thereof is placed thereatop, and a display device 30 that may be built into a side of stand 31 as depicted in FIG. 4 or which may be provided in the form of a cantilevered shelf as depicted in FIG. 5.

A sensor grid 39 (FIG. 4) is built into top surface 32; the grid is connected to a microprocessor 37. The grid must be able to sense the presence of a ball within a well, i.e., the bottom wall 12 of the game device 10 must not be built of a material that is impervious to grid 39. Each well could have an open bottom so that balls seated therein contact grid 39.

Figure 5:
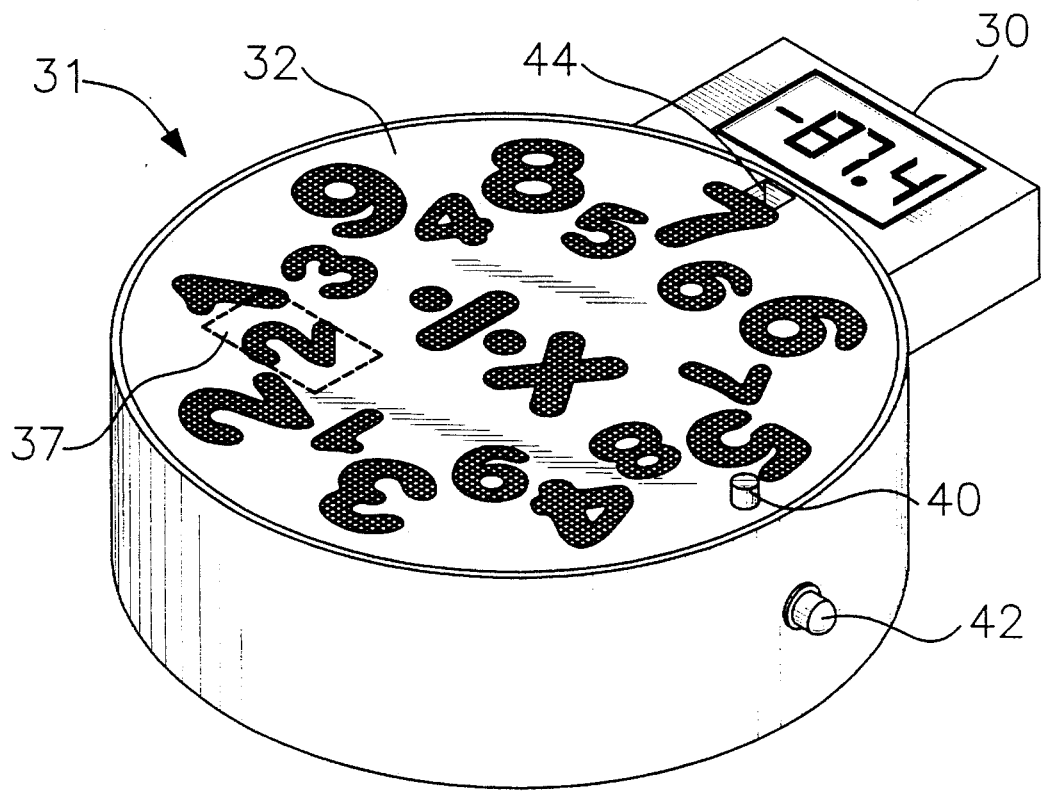
FIG. 5 is a perspective view of a variation of the stand of FIG. 4.

Grid 39 may also be provided in the form of a plurality of discrete sensor means 41 as depicted in FIG. 5. As in the embodiment of FIG. 4, the bottom of each well could be open, i.e., slotted or apertured, so that a small part of each ball positioned within a well could extend through such opening and physically contact a discrete sensor 41.

A switch means 40 is mounted on flat support surface 32 for activating said sensor grid 39 or discrete sensors 41 and microprocessor 37 when game device 10 is placed atop said flat support surface. The switch means may be mechanical as shown and biased upwardly so that it closes and connects a battery 42 to sensor grid 39 or sensors 41 when game device 10 is placed thereatop, or said switch means may be of a nonmechanical type that senses the presence of a game device thereatop.

As index means 44 is required in the embodiments of FIGS. 4 and 5, so that device 10 will always be placed thereatop in the same rotational orientation. In this example, the index means is a bore 44 formed in top surface 32; a corresponding alignment peg (not shown) depends from bottom wall 12 of device 10 and mates with said bore 44 to properly align device 10 and stand 31.

Accordingly, placing game device 10 atop surface 32 after playing the game as described above provides a virtually instantaneous read out of the correct answer, thereby delighting the children who played the game and enabling them to perform a recalculation if their answer was wrong.

It is important to note that in this particular embodiment, the collective size of the numbers of the first set of numbers is greater than the collective size of the numbers of the second set of numbers, Since the balls will be essentially randomly distributed among the various wells when the game is played, this means that more balls will normally be captured within the first set of numbers. Since in this particular embodiment the numbers of the first set of numbers represent the number off addition operations required as above-explained, whereas the numbers of the second set of numbers represent the number of subtraction operations required, this difference in sizing, tilted towards positive numbers, increases the chances that the children playing the game will be dealing in positive numbers. A reversal of the respective collective sizes would tilt the game towards negative numbers and would be more desireable for older children.

This invention also contemplates embodiments where the relative sizes of the numbers of the first and second sets would be the same so that the device would contain no inherent bias toward positive or negative numbers.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A game device, comprising:

a flat bottom wall of predetermined geometrical configuration;

a first plurality of number-shaped wells formed in said flat bottom wall in circumferentially and equidistantly spaced relation to one another;

a second plurality of number-shaped wells formed in said flat bottom wall in circumferentially and equidistantly spaced relation to one another;

said second plurality of number-shaped wells being disposed radially inwardly of said first plurality of number-shaped wells;

a multiply sign formed in said flat bottom wall, substantially centrally thereof;

a divide sign formed in said bottom wall, substantially centrally thereof;

a plurality of balls disposed in rolling engagement to said flat bottom wall; and a transparent cover mounted about a peripheral edge of said bottom wall, said transparent cover having a clearance relative to said flat bottom wall sufficient to represent no impediment to the rolling of said plurality of balls atop said bottom wall.

2. The game device of claim 1, wherein the numbers of said first set of numbers have a first common height, wherein the numbers of said second set of numbers have a second common height, and wherein said first and second common heights are different from one another.

3. The game device of claim 2, wherein the predetermined geometrical configuration of said flat bottom wall is circular, and wherein said transparent cover has a dome shape.

4. The game device of claim 1, further comprising:

a plurality of sensor means associated with each of said wells of said first and second plurality of number-shaped wells, each sensor means of said plurality of sensor means adapted to count the number of balls within a well within which said sensor means is associated and operative to generate a signal containing information concerning the number of balls counted;

a microprocessor connected to said sensor means, said microprocessor programmed to perform a predetermined set of arithmetical computations based upon information received in said signals; and a display means connected in driven relation to said microprocessor for displaying a computation performed by said microprocessor.

5. The game device of claim 4, wherein said display means is fixedly mounted on a bottom side of said flat bottom wall in an orientation that enables viewing of the computation.

6. The game device of claim 4, wherein said display means is slideably mounted on a bottom side of said flat bottom wall in an orientation that enables viewing of the computation only when said display means is slideably displaced out from under said flat bottom wall.

7. The game device of claim 1, further comprising:

a ball counting and display stand unconnected to said game device;

said ball counting and display stand having a flat support surface adapted to receive thereatop said flat bottom wall of said game device;

a plurality of sensor means formed in said flat support surface for sensing and counting the number of balls within each well formed in said flat bottom wall, each sensor means of said plurality of sensor means adapted to generate a signal containing information as to the number of balls sensed;

a microprocessor mounted within said ball counting and display stand, said microprocessor connected to each sensor means of said plurality of sensor means and being programmed to perform a predetermined set of arithmetical operations based upon information contained in signals generated by each of said sensor means;

an index means for aligning said game device and said ball counting and display stand in a predetermined alignment when said game device is placed atop said ball counting and display stand;

a display means mounted on said ball counting and display stand, said display means connected in driven relation to said microprocessor for displaying a numerical value generated by said microprocessor; and a switch means mounted on said flat support surface for activating said sensor means and said microprocessor when said game device is placed atop said flat support surface.

8. The game device of claim 7, wherein said plurality of sensor means is provided in the form of an electrically conductive grid.

9. The game device of claim 7, wherein said plurality of sensor means is provided in the form of a plurality of discrete sensor means.

* * * * *